United States Patent Office 3,410,904
Patented Nov. 12, 1968

3,410,904
PRODUCTION OF TRIMETHYLAMINE
Kenzie Nozaki, El Cerrito, Calif., assignor to Shell Oil Company, New York, N.Y., a corporation of Delaware
No Drawing. Filed July 19, 1965, Ser. No. 473,241
11 Claims. (Cl. 260—583)

ABSTRACT OF THE DISCLOSURE

Trimethylamine is produced by reaction of ammonia, carbon monoxide and hydrogen in the presence of Group VIII–C–I–B metal-containing catalysts.

---

This invention relates to an improved process for the production of trimethylamine.

Methods are available in the art for the production of trimethylamine. The method most typically employed is the alkylation of ammonia with methanol in the presence of an alumina catalyst. Alternative catalytic methods include alklylation of ammonia or methylamine with a methyl halide or formaldehyde. In general, known methods for trimethylamine production are characterized by a multiplicity of process steps and by low yields of trimethylamine per pass over the catalyst.

It would be of advantage to provide an improved method for the production of trimethylamine and that is an object of the present invention. More particularly, it is an object to provide an improved process of trimethylamine production wherein the selectivity to tertiary amine is comparatively high so that the amine is recoverable with a minimum of processing difficulties.

It has now been found that these objects are accomplished by the process of reacting ammonia with carbon monoxide and hydrogen, or alternatively with precursors thereof, in the presence of certain metal catalysts. The process of the invention is characterized by a high selectivity for conversion of the ammonia to trimethylamine with minimal production of methylamine and dimethylamine.

The improved process of the invention is conducted by contacting the reactants in the presence of a metal-containing catalyst. Although a number of metals, particularly transition metals of Group VIII of the Periodic Table, are in part operable in the process of the invention, the preferred catalysts are metals, or compounds thereof, which do not readily form carbonyl complexes wherein each ligand is carbonyl. Thus, metals such as nickel are not suitably employed as catalyst in the process of the invention. Metals which are suitably employed are generically classified by consideration of what is termed the "long form" of the Periodic Table, for example, the form presented in "The Merck Index," Merck & Co., Inc., Rahway, N.J., 1952, 6th edition, wherein it is observed that the third family of Group VIII metals, herein termed Group VIII–C metals, directly adjoins the Group I–B family of metals. Catalysts that are suitably employed in the present process incorporate metals which are Group VIII–C–Group I–B metals of atomic number from 29 to 79 inclusive, i.e., the metals copper, palladium, silver, platinum and gold. Although nickel is also a member of Group VIII–C, as previously stated the utilization of nickel-containing catalysts is not considered satisfactory due to the formation therefrom of stable nickel carbonyls, e.g., nickel tetracarbonyl. In general, the use of a catalyst containing a Group I–B family metal, i.e., copper, silver, or gold, is preferred over the use of analogous Group VIII–C metal-containing catalysts, and best results are obtained when a copper catalyst is employed.

The chemical state in which the metal moiety of the catalyst exists during the amine production process is not known with certainty, nor does it appear to be critical, as good results are obtained when the metal moiety is provided as the elemental metal per se, or alternatively the provision of the metal moiety in a chemically combined form is also satisfactory.

In one modification of the process, the catalyst comprises the elemental metal per se, for example, a Raney metal such as Raney copper or Raney silver, or alternatively metal supported on an inert carrier, e.g., silica, alumina or the like, as in the form of a metal film deposited upon a support in particulate form. In another modification, the catalyst comprises metal bonded to the support wherein the support functions as an anion, for example, the metal-containing compositions prepared by ion exchange between aqueous solutions of the metal whose presence in the catalyst is desired and a support having acidic sites, particularly Bronsted acid sites, such as silica, silica-alumina, silica-magnesia or zeolitic materials commonly termed molecular sieves.

In yet another modification, the metal is provided in a chemically combined form, e.g., as a metal salt or as the metal oxide, and is employed as such or in conjunction with an inert carrier. One class of metal compound catalysts comprises the metal oxide supported upon an inert support. Such supported metal oxide catalysts are typically prepared by impregnation of the support with an aqueous solution of a salt of the desired metal, particularly the nitrate or acetate. The supported catalyst composition is then calcined to produce the supported metal oxide catalyst. An additional class of metal compound catalysts comprises unsupported metal compounds, e.g., metal fluorides or chlorides, which are stable under the conditions of the process of the invention. For example, compounds such as copper fluoride, gold fluoride and palladium chloride are suitably employed as catalyst.

In the preferred modification of the invention, the catalyst comprises a Group VIII–C—Group I–B metal oxide, wherein the metal has an atomic number of from 29 to 79 inclusive, which metal oxide is employed in conjunction with one or more additional oxides of metals which are not themselves satisfactory catalysts. A particularly preferred class of mixed oxide catalysts are the Group I–B chromites, i.e., copper chromite, silver chromite and gold chromite. These materials, of somewhat indefinite composition, are characterized by the presence therein of approximately equimolar proportions of chromium and the Group I–B metal, in chemical combination with oxygen. This class of Group I–B chromites is utilized with the optional additional presence of up to about 20% by weight of other metal oxides, particularly oxides of Group II metals such as barium, calcium, strontium, cadmium and zinc, which Group II metal oxides serve to promote or otherwise modify the activity of the Group I–B chromite. Copper chromite catalysts with or without the presence of Group II metal oxide are commercially obtainable materials, and in part for this reason, copper chromite catalysts of up to about 15% by weight of Group II metal oxide constitute a particularly suitable class of metal-containing catalysts for the process of the invention. Best results are obtained through utilization of a copper chromite catalyst containing up to about 15% by weight of a Group II–A metal of atomic number from 20 to 56, i.e., calcium, strontium or barium.

The process of the invention comprises contacting the metal-containing catalyst with ammonia admixed with hydrogen and carbon monoxide or alternatively with precursors thereof. Without wishing to be bound by any particular theory, it appears likely that the reaction responsible for the formation of trimethylamine in the process of the invention is represented by the equation given below.

$$NH_3 + 3CO + 6H_2 \rightarrow (CH_3)N + 3H_2O$$

In the preferred modification of the process, carbon monoxide and hydrogen are employed as reactants together with the ammonia. Alternatively, however, other carbon oxides and hydrogen compounds are suitably utilized as carbon monoxide and hydrogen precursors. For example, the following reactions are known to occur at elevated temperature:

$$CO + H_2O \rightarrow CO_2 + H_2$$
$$CO_2 + H_2 \rightarrow CO + H_2O$$

Thus, a mixture of an excess of carbon monoxide and water, or alternatively a mixture of carbon dioxide and an excess of hydrogen may be used for reaction with ammonia to produce trimethylamine. However, the utilization of such precursor mixtures offers no apparent advantage and at times serves as a detriment because of results. Accordingly, the use of carbon monoxide and hydrogen for reaction with ammonia is preferred.

From stoichiometric considerations of the reaction, as depicted above, one mole of ammonia reacts with three moles of carbon monoxide and six moles of hydrogen. In practice, however, other ratios of reactants give satisfactory results and in some instances are to be preferred. Molar ratios of carbon mononxide to ammonina from about 2:1 to about 15:1 are satisfactory with best results being obtained when the molar ratio of carbon monoxide to ammonia is from about 3:1 to about 6:1. Suitable molar ratios of hydrogen to ammonia vary from about 2:1 to about 30:1, although molar ratios of hydrogen to ammonia from about 3:1 to about 10:1 are preferred. The precise ratio of reactants does not appear to be critical, however, so that somewhat higher or somewhat lower reactant ratios may be utilized.

The process of the invention is conducted in the vapor phase at elevated temperature and pressure. Reaction temperatures from about 2000 C. to about 400° C. are satisfactory with the reaction temperature range from about 250° C. to about 375° C. being preferred. The reaction pressure to be employed will chiefly depend upon the temperature employed as well as the quantity and ratio of the reactants present, as in most cases the reaction pressure is the summation of the partial pressures of the individual reactants present. Typical reaction pressures vary from about 1.5 atmospheres to about 200 atmospheres, preferably from about 3 atmospheres to about 180 atmospheres. In one modification of the instant process, inert diluent is present, e.g., diluents such as argon, helium, nitrogen, methane and the like which are gaseous at reaction temperature, in which instance the pressure is properly considered as the sum of the partial pressures of the reactants. In the preferred modification of the process of the invention, however, the reactants and catalysts are contacted in the substantial absence of added inert diluent.

The process is adptable for operation in a batchwise manner, as by charging the reactants and catalysts to an autoclave or similar pressure reactor which is maintained at reaction temperature until reaction is complete. Preferably, the process is conducted in a continuous manner as by passing the reactants through a tubular reactor containing the catalyst and maintained at reaction temperature. By either method, one reactant may be added to the others in increments, as by adding one reactant to the reaction mixture at intervals while the mixture is passing through a continuous-process reactor, although it is equivalently useful to initially mix the entire amounts of reactants. Subsequent to reaction, the product mixture is separated and the desired trimethylamine is recovered by conventional methods, e.g., selective condensation, selective absorption and the like. Although the product mixture of necessity will contain major molar proportions of by-products, principally water, methane and carbon dioxide, product separation is easily accomplished and when the composition of the product mixture is considered on a percent by weight basis, the proportion of trimethylamine is comparatively high.

The product of the process of the invention, trimethylamine, is a chemical of commerce and has established utility as a chemical intermediate, for example, in the production of detergents and other surface-active materials and choline salts.

To further illustrate the improved process of the invention, the following examples are provided. It should be understood that the details thereof are not to be regarded as limitations, as they may be varied as will be understood by one skilled in this art.

Example I

To a pressure vessel was charged 2 g. of copper chromite containing 10% wt. of barium oxide. The vessel was evacuated to remove the air present, charged with 100 p.s.i.g. of ammonia, 300 p.s.i.g. of carbon mononxide and 600 p.s.i.g. of hydrogen and maintained at 300° C. for 4 hours. The product mixture was analyzed by gas-liquid chromatography and mass spectrometry and found to consist of 51.3% wt. trimethylamine, 0.4% wt. dimethylamine, 0.2% wt. methylamine, 34.3% wt. carbon dioxide, 4.4% wt. carbon monoxide, 5.8% wt. hydrogen, 0.2% wt. water, 2.2% wt. ammonia, 1.1% wt. methane and 0.3% wt. ethane. The conversion of ammonia was 73% and the selectivity to trimethylamine based on ammonia converted was 99%.

Example II

By a procedure similar to that of Example I, 2 g. of copper chromite containing 10% wt. barium oxide was contacted with a feed comprising 100 p.s.i.g of ammonia, 300 p.s.i.g. carbon dioxide and 900 p.s.i.g. hydrogen. The mixture, in a 50 ml. reactor, was maintained at 300° C. for 20 hours. Gas-liquid chromatographic and mass spectrometric analyses of the product mixture indicated the presence of 13.6% wt. trimethylamine.

By a similar procedure, 0.5 g. of the catalyst mixture was contacted with a feed consisting of 115 p.s.i.g. of ammonia, 600 p.s.i.g. of carbon monoxide and 300 p.s.i.g. of water vapor. Subsequent to a reaction period of 6 hours at 350° C., the product mixture was shown by gas-liquid chromatographic and mass spectrometric analyses to contain trimethylamine.

Example III

A series of experiments was conducted employing various reaction mixtures, reaction temperatures and reaction time. n each case, a 50 ml. reaction vessel was employed for the reaction and the catalyst was copper chromite promoted by 10% wt. barium oxide. The product mixture, subsequent to reaction, was analyzed by gas-liquid chromatography and mass spectrometry. The results obtained in this series are shown in Table I.

TABLE I

| Catalyst, g. | Time, hrs. | Temp., °C. | Feed, p.s.i.g. | | | $(CH_3)_3N$, percent weight |
|---|---|---|---|---|---|---|
| | | | $NH_3$ | CO | $H_2$ | |
| 2 | 4 | 300 | 50 | 300 | 900 | 40.2 |
| 2 | 4 | 300 | 100 | 300 | 900 | 51.5 |
| 2 | 4 | 300 | 100 | 300 | 600 | 51.5 |
| 0.5 | 16 | 300 | 115 | 300 | 600 | 46 |
| 2 | 2 | 325 | 100 | 300 | 600 | 49 |
| 2 | 4 | 300 | 100 | 600 | 600 | 32 |
| 2 | 16 | 300 | 100 | 600 | 350 | 27 |
| 2 | 16 | 300 | 200 | 600 | 300 | 24 |
| 2 | 4 | 300 | 50 | 150 | 300 | 28 |
| 2 | 20 | 300 | 25 | 75 | 150 | 28 |
| 2 | 16 | 275 | 100 | 600 | 600 | 28 |

Example IV

A series of experiments was conducted employing a variety of copper catalysts. In each case the catalyst was charged to a 50 ml. reactor and contacted with a feed consisting of 115 p.s.i.g. ammonia, 300 p.s.i.g. carbon monoxide and 600 p.s.i.g. hydrogen. At the end of the indicated reaction time, the product mixture was analyzed by gas-liquid chromatography and mass spectrometry to determine the weight percentage of trimethylamine present in the product mixture. The results of this series are shown in Table II.

TABLE II

| Catalyst | Catalyst, g. | Time, hrs. | Temp., °C. | $(CH_3)_3N$, percent weight |
|---|---|---|---|---|
| Copper chromite plus 10% wt. BaO | 0.5 | 19 | 300 | 46 |
| Copper chromite plus 10% wt. CaO | 0.5 | 16 | 300 | 46 |
| Copper chromite | 0.1 | 16 | 300 | 40 |
| 5% Cu on $SiO_2$ (prepared by ion exchange) | 1 | 16 | 350 | 35 |
| 30% CuO on $SiO_2$ (prepared by impregnation) | 1 | 16 | 350 | 7.5 |
| 5% Cu on $Al_2O_3$ (prepared by ion exchange) | 1 | 22 | 350 | 0.5 |
| Copper zinc chromite | 0.5 | 16 | 350 | 10 |
| 5% Cu on 5A molecular sieve (prepared by ion exchange) | 1 | 16 | 350 | 2 |
| $CuF_2$ | 0.5 | 16 | 305 | 1 |
| Copper chromite plus 10% wt. BaO | 0.5 | 3 | 350 | 11.3 |
| Raney copper | 0.5 | 2 | 350 | 4 |
| Copper silicate (prepared by coprecipitation) | 0.5 | 3 | 350 | 6.3 |

Example V

A series of experiments was conducted employing various metal catalysts of the invention. In each case, the indicated amount of catalyst was charged to a 50 ml. reactor and contacted with a feed consisting of 115 p.s.i.g. of ammonia, 300 p.s.i.g. of carbon monoxide and 600 p.s.i.g. of hydrogen. Subsequent to the specified reaction time, the weight percentage of trimethylamine present in the product mixture was determined by gas-liquid and mass spectrometric analyses. The results of this series are shown in Table III.

TABEL III

| Catalyst | Catalyst, g. | Time, hrs. | Temp., °C. | $(CH_3)_3N$, percent weight |
|---|---|---|---|---|
| Copper chromite plus 10% wt. BaO | 2 | 4 | 300 | 51.5 |
| Silver chromite | 2 | 24 | 300 | 13 |
| 5% Ag on $SiO_2$ (prepared by ion exchange) | 2 | 24 | 300 | 25.1 |
| Gold chromite | 0.2 | 16 | 300 | 15.8 |
| 1.5% Pd (as $PdCl_2$) on $SiO_2$ | 2 | 24 | 300 | 40.3 |
| 5% Pt on $SiO_2$ (prepared by ion exchange) | 2 | 29 | 300 | 43.2 |
| 5% Pt on $Al_2O_3$ | 1 | 16 | 275 | 26 |

I claim as my invention:

1. The process of preparing trimethylamine by intimately contacting ammonia, carbon monoxide and hydrogen in the presence of a metal-containing catalyst wherein the metal is Group VIII-C—I-B metal of atomic number from 29 to 79 inclusive, at a temperature of from about 200° C. to about 400° C. and a pressure of from about 1.5 atmospheres to about 200 atmospheres.

2. The process of preparing trimethylamine by intimately contacting ammonia, carbon monoxide and hydrogen in the presence of a metal-containing catalyst wherein the metal is Group I-B metal, at a temperature of from about 200° C. to about 400° C. and a pressure of from about 1.5 atmospheres to about 200 atmospheres.

3. The process of preparing trimethylamine by intimately contacting a mixture of ammonia, from about 2 moles to about 15 moles of carbon monoxide per mole of ammonia and from about 2 moles to about 30 moles of hydrogen per mole of ammonia, with a catalyst comprising of Group VIII-C—Group I-B metal oxide wherein the metal is of atmoic number from 29 to 79 inclusive, at a temperature of from about 250° C. to about 375° C. and a pressure of from about 3 atmospheres to about 180 atmospheres.

4. The process of claim 3 wherein the metal is Group I-B metal.

5. The process of claim 4 wherein the Group I-B metal is copper.

6. The process of preparing trimethylamine by intimately contacting a mixture of ammonia, from about 2 moles to about 15 moles of carbon monoxide per mole of ammonia and from about 2 moles to about 30 moles of hydrogen per mole of ammonia, at a temperature of from about 250° C. to about 375° C. and a pressure of from about 3 atmospheres to about 180 atmospheres, with a catalyst of essentially a Group I-B metal chromite containing up to about 20% by weight of a Group II metal oxide.

7. The process of claim 6 wherein the catalyst comprises copper chromite containing up to about 15% by weight of a Group II-A metal oxide wherein the Group II-A metal is of atomic number from 20 to 56.

8. The process of claim 7 wherein the Group II-A metal is barium.

9. The process of claim 6 wherein the catalyst comprises copper chromite.

10. The process of claim 6 wherein the catalyst comprises gold chromite.

11. The process of preparing trimethylamine by intimately contacting ammonia, carbon dioxide and an excess of hydrogen in the presence of a metal-containing catalyst wherein the metal is Group I-B metal, at a temperature of from about 200° C. to about 400° C. and a pressure of from about 1.5 atmospheres to about 200 atmospheres.

References Cited

Bashkirov et al.: Chemical Abstracts, vol. 57, page 16,373f (1962).

CHARLES B. PARKER, *Primary Examiner.*

R. L. RAYMOND, *Assistant Examiner.*